United States Patent

Patent No.: 6274

The United States of America

TO ALL TO WHOM THESE Letters Patent SHALL COME:

Whereas [illegible] [illegible] [illegible] [illegible]

the United States hath alleged that he has invented a new and useful improvement

[illegible] [illegible] [illegible] [illegible] [illegible]

which improvement he states has not been known or used before his application hath [illegible] that he does verily believe that he is the true inventor or discoverer of the said improvement hath paid into the treasury of the United States the sum of thirty dollars delivered a receipt for the same and presented a petition to the Secretary of State signifying a desire of obtaining an exclusive property in the said improvement and praying that a patent may be granted for that purpose. These are therefore to grant according to law, to the said [illegible] his heirs administrators or assigns for the term of fourteen years from the [illegible] day [illegible] one thousand eight hundred and [illegible] the full and exclusive right and liberty of making, constructing, using and vending to others to be used, the said improvement a description whereof is given in the words of the said [illegible] hereof in the schedule hereto annexed and is made a part of these presents.

In Testimony whereof, I have caused these Letters to be made Patent, and the Seal of the United States to be hereunto affixed.

GIVEN under my hand at the City of Washington this [illegible] day of [illegible] in the year of our Lord one thousand eight hundred and [illegible] and of the independence of the United States of America the [illegible]

[illegible]

BY THE PRESIDENT.

[illegible] Secretary of State

City of Washington, TO WIT:

I DO HEREBY CERTIFY That the foregoing Letters Patent were delivered to me on the [illegible] day of [illegible] in the year of our Lord one thousand eight hundred and [illegible] to be examined that I have examined the same and find them conformable to law and I do hereby return the same to the Secretary of State within fifteen days from the date aforesaid, to wit, on this [illegible] day of [illegible] in the year aforesaid.

[illegible] Attorney General of the United States